Nov. 22, 1949  H. J. SIEKMANN ET AL  2,489,203
AUTOMATIC LATHE FEED MECHANISM
Filed Oct. 25, 1946  5 Sheets-Sheet 1

FIG. 1

INVENTORS.
HAROLD J. SIEKMANN
AND HARRY C. KEMPER
BY
Toulmin + Toulmin
ATTORNEYS.

Nov. 22, 1949  H. J. SIEKMANN ET AL  2,489,203
AUTOMATIC LATHE FEED MECHANISM
Filed Oct. 25, 1946  5 Sheets-Sheet 2

INVENTORS.
HAROLD J. SIEKMANN
AND HARRY C. KEMPER
BY
Toulmin + Toulmin
ATTORNEYS.

Nov. 22, 1949  H. J. SIEKMANN ET AL  2,489,203
AUTOMATIC LATHE FEED MECHANISM
Filed Oct. 25, 1946  5 Sheets-Sheet 4

INVENTORS.
HAROLD J. SIEKMANN
AND HARRY C. KEMPER
BY
Toulmin & Toulmin
ATTORNEYS.

INVENTORS.
HAROLD J. SIEKMANN
AND HARRY C. KEMPER
BY
Willard S. Grove
ATTORNEY.

Patented Nov. 22, 1949

2,489,203

UNITED STATES PATENT OFFICE 2,489,203

AUTOMATIC LATHE FEED MECHANISM

Harold J. Siekmann, Cincinnati, and Harry C. Kemper, Goshen Township, Clermont County, Ohio, assignors to The R. K. Le Blond Machine Tool Co., Cincinnati, Ohio, a corporation of Delaware Application October 25, 1946, Serial No. 705,640

10 Claims. (Cl. 82—21)

This invention pertains to machine tools and is particularly directed to improvements in automatic lathe mechanism.

One of the objects of this invention is to provide an improved feed transmission mechanism for actuating the tool slides of an automatic lathe.

Another object of this invention is to provide an improved feed transmission for an automatic lathe which is adaptable to quick set up and accuracy and simplicity of control to meet a large variety of working conditions.

Another object of this invention is to provide an improved electric control mechanism for the feed mechanism of an automatic lathe.

It is also an object of this invention to provide a simple and effective means for providing sequential delayed control of the longitudinal movement of the tool slide in relation to the cross feed movement thereof.

And a still further object of this invention is to provide an improved feed and rapid traverse operating mechanism for a cam drum-controlled tool feeding mechanism, including a lost motion arrangement for effecting a delayed sequential series of movements between the longitudinal and cross feed movements of the tool slide.

It is also the purpose of this invention to provide a novel and improved electrical control mechanism for an automatic lathe feed mechanism.

Further features and advantages of this invention will appear from a detailed description of the drawings in which.

For illustrative purposes, this invention is shown applied to an automatic lathe having a bed 10 mounted on suitable supporting legs 11 and 12. The head stock 13, containing the work spindle 14 and center 15, is appropriately fixed to the bed 10. A tail stock 16 is suitably adjustably mounted on the guideway surfaces 17 and 18 of the bed and clamped in any desired longitudinal position therealong by suitable clamping nuts 19.

Mounted to slide longitudinally on the guideways 17 and 20 is the front tool carriage 21. A rear tool carriage 22 is arranged to slide longitudinally of the bed on the guideways 23 and 24. On the front tool carriage is mounted the cross slide 25 on suitable guideways 26 and contains an appropriate tool block 27 carrying the front cutting tools 28. The rear tool carriage 22 is provided with a cross slide 29 mounted on suitable guideways 30 on the rear carriage 22 and upon which is mounted a suitable tool block 31 carrying the rear cutting tools 32.

Figure 6:
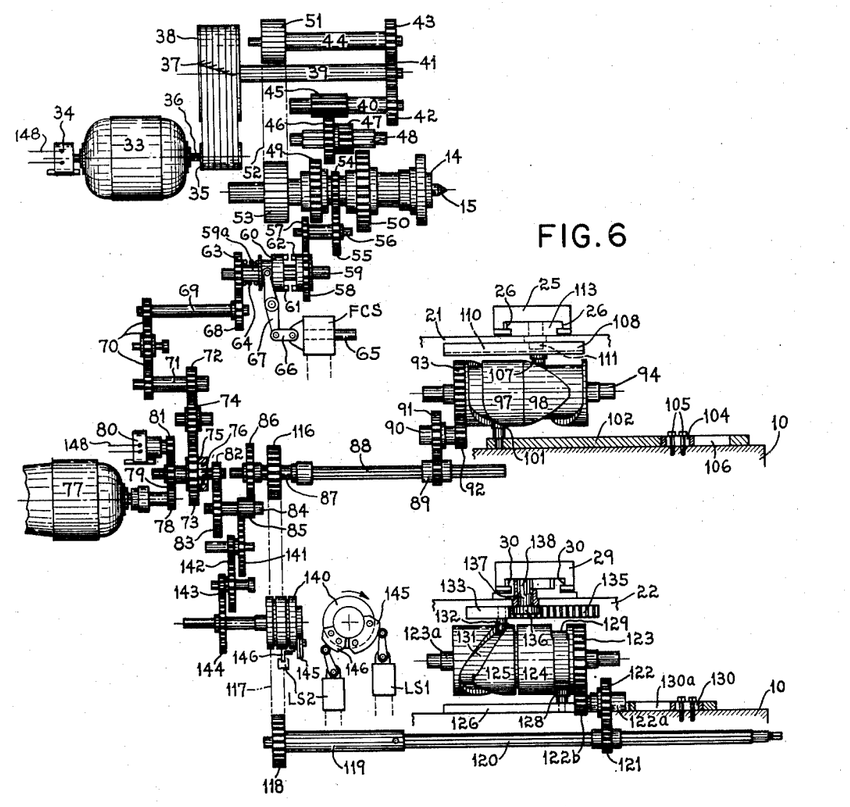
Figure 6 is a diagrammatic layout of the power transmission gearing of the lathe feed and rapid traverse mechanism.

Referring particularly to Figure 6, power for driving the work spindle 14 and for actuating the tool carriages and slides in feeding movement is derived from the main drive spindle motor 33 to which is drivingly attached the zero speed switch 34 and a pulley 35 on the motor shaft 36 and is connected by suitable belts 37 to the main drive pulley 38 carried on the input drive shaft 39 journaled in the head stock 13. The shaft 39 is adapted to be connected at one time with the shaft 40 of the head stock transmission by placing change gears at 41 and 42, while at another time change gears may be placed at 41 and 43 to interconnect drive from the shaft 39 to a shaft 44.

Figure 1:
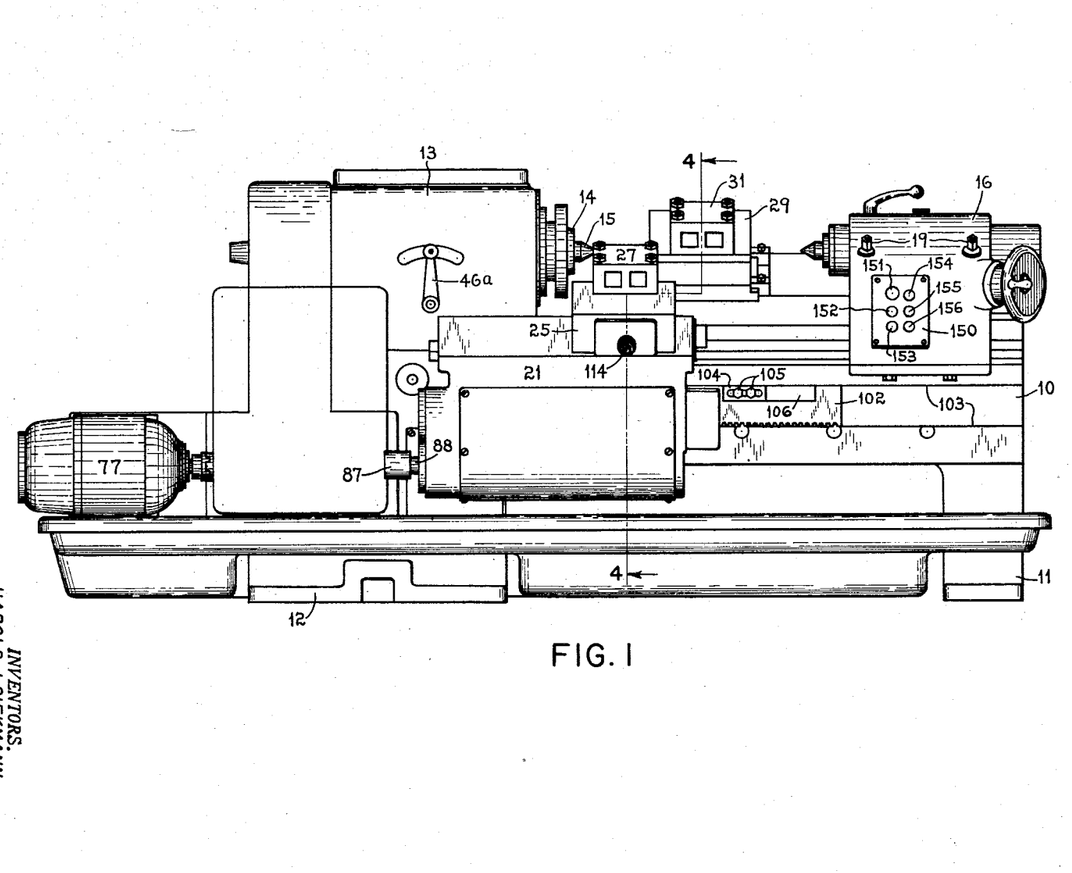
Figure 1 is a front elevation showing an automatic lathe incorporating the features of this invention.
Figure 2:
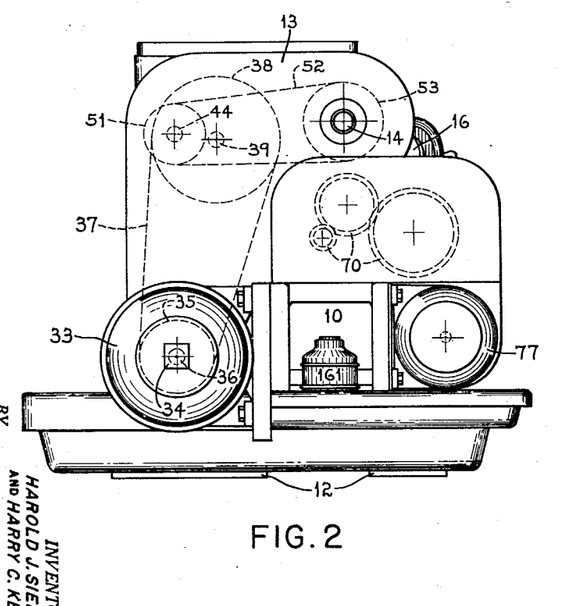
Figure 2 is a left-hand end elevation of the automatic lathe shown in Figure 1.
Figure 3:
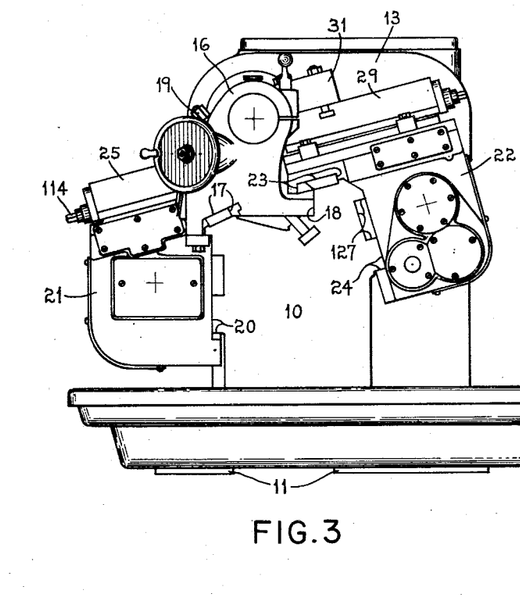
Figure 3 is a right-hand end elevation of the automatic lathe shown in Figure 1.

When the shaft 40 is being driven, its gear 45 drives continuously a larger gear 46 of the compound gear 46—47 mounted on a shaft 48 in the head stock 13. The gear 46—47 may be shifted by operating lever 46a, Figure 1, so at one time to connect the gear 46 with the gear 49 fixed on the lathe spindle 14 while at another time for shifting the gear 47 into engagement with a gear 50 fixed on the spindle. When the shaft 39 is connected to the change gears 41—43 to drive the shaft 44, a chain sprocket gear 51 fixed on the shaft 44 and driving through the chain 52 applies power to the chain sprocket gear 53 mounted on the work spindle 14. Thus three ranges of change gear drive may be effected to the spindle 14 coupled with the change effected by the shifting of the gear 46—47 so that there is provided a variable or change speed transmission for rotating the work spindle at any desired cutting speed.

The feed drive power take-off for actuating the tool carriages and slides is derived from a gear 54 fixed on the work spindle 14 and connected to drive a gear 55 on a shaft 56 to which is fixed the gear 57. The gear 57 is connected to drive a gear 58 rotatably journaled on the feed output shaft 59 of the head stock. The shaft 59 is formed with a splined portion 59a on which is drivingly mounted the feed disconnect clutch spool 60 having clutch teeth 61 adapted to engage clutch teeth 62 formed on the gear 58. An output gear 63 fixed to the shaft 59 serves as one confining abutment for the compression spring 64 which engages the spool 60 so as to normally maintain the clutch teeth 61 and 62 in feed driving engagement from the spindle 14 to the gear 63. A feed clutch solenoid FCS has its armature 65 connected through a suitable link 66 and the lever 67 so that when energized it releases the clutch spool 60 from the gear 58 by compressing the spring 64 and when de-energized the solenoid FCS allows the spring 64 to automatically reconnect the feed clutch spool 60 with the gear 58.

Driving power from the gear 63 is conveyed to the gear 68 and through the shaft 69 to the change gears 70 at the left hand end of the lathe head stock end of the bed. Power then passes through the shaft 71 to a gear 72 which is connected to a gear 73 through an idler gear 74. The gear 73 is formed on the outside driving ring of an overrunning clutch 75 which is so arranged that the gear 73 may drive the shaft 76 in the forward feed direction but that rotation of the shaft 76 at a more rapid rate than the rate of rotation of the gear 73 will not cause the gear 73 to be driven from the shaft 76. Thus forward feed driving power is applied to the shaft 76 through the overrunning clutch 75.

Rapid traverse driving power is applied to the shaft 76 from a reversible rapid traverse drive motor 77 having a gear 78 connected to drive a gear 79 fixed to the shaft 76. A zero speed switch 80 is connected through a gear 81 also to be driven from the gear 79. Thus whenever the rapid traverse motor 77 is energized in the forward direction, shaft 76 may overrun or rotate at a more rapid rate than the overrunning clutch 75 and the gear 73 being operated at feeding rate from the headstock spindle 14. When it is desired to reverse the rapid traverse movement, solenoid FCS is energized to release the clutch spool 60 from the gear 58 so that the rapid traverse motor will not have to drive the lathe transmission back through the overrunning clutch 75 and the high speed-up drive gearing necessary to provide proper feed rate drive from the spindle 14 to the shaft 76. Thus the rapid traverse motor 77 may be reversibly operated for effecting rapid traverse movements to the tool carriages and slides in either direction.

Driving power from the shaft 76 is transmitted from the gear 82 fixed on the shaft to a gear 83 fixed on the shaft 84 which in turn has fixed on it a gear 85 driving a gear 86 fixed on the drive shaft 87 journaled on the bed of the lathe in any suitable manner and having an elongated splined portion 88 extending longitudinally along the front of the lathe bed. The splined portion 88 projects into a mating driving splined bore in the driving gear 89 which is journaled against axial rotation in the front carriage 21. An idler shaft 90 suitably journaled in the carriage 21 has a gear 91 driven from the gear 89 and a gear 92 fixed to it which drives the cam drum gear 93 carried on the cam drum shaft 94 suitably journaled against axial movement in the carriage 21 in bearings 95 and 96, Figure 5.

Figure 4:
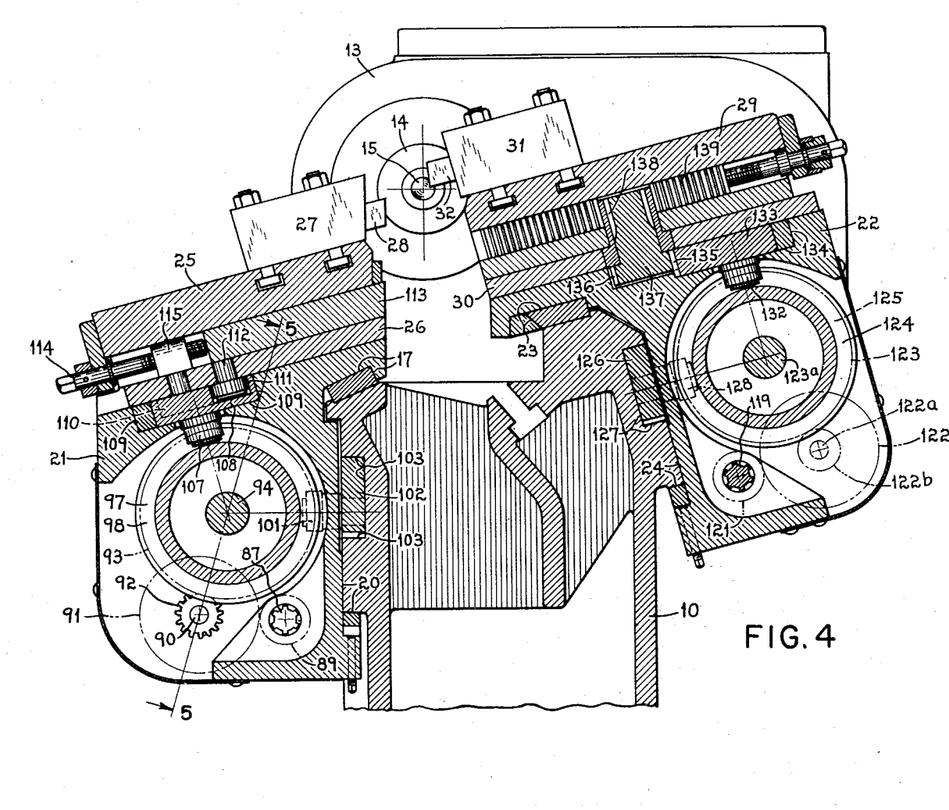
Figure 4 is an enlarged fragmentary transverse section through the automatic lathe on the line 4—4 of Figure 1.
Figure 5:
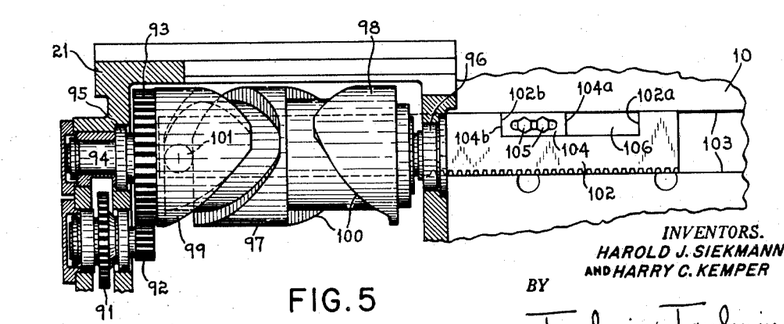
Figure 5 is a fragmentary enlarged section through the cam drum mechanism of the front carriage indicated by the line 5—5 in Figure 4.

Fixed to rotate with the shaft 94 are the cam drums 97 and 98. The cam drum 97 has a cam slot 99 for effecting the longitudinal movement of the carriage along the bed 10, while the cam drum 98 has a cam surface 100 for effecting the cross slide movement of the slide 25. Cooperating with the cam slot 99 in the cam drum is a cam roller 101 which is fixed on a cam bar 102 arranged to slide longitudinally of the bed in suitable guideways 103 formed in the bed 10, as best seen in Figures 4 and 5. An adjustable abutment and dwell block 104, adjustably held in place by suitable screws 105 to the bed 10, has abutment surfaces 104a and 104b cooperatively engaging with the surfaces 102a and 102b formed by the slot 106 in the bar 102. By proportioning the space between the surfaces 104a and 104b relative to the width of the slot determined by the surfaces 102a and 102b, a predetermined relative motion of the bar 102 with respect to the bed may be obtained.

The purpose of this lost motion arrangement between the block 104 and the bar 102 is to provide an initial dwell or nonmovement period for the carriage 21 during a continuous movement of the rotation of the shaft 94. Thus, as the shaft 94 and cam drum 97 initially rotate, the bar 102 will be moved from position shown in Figure 5, without movement of the carriage along the bed, until the surface 102a engages the surface 104a, whereupon the cam drum reacting with the roller 101 will then cause longitudinal movement of the carriage 21.

During the period of nonmovement of the carriage as the surface 102a approaches the surface 104a, the cam drum 98 may operate with its cam surface 100 engaging the cam plate roller 107 on the cam plate 108 mounted in suitable guideways 109 for longitudinal sliding movement in the carriage 21. The portion of the cam plate 108 is formed with a suitable cam slot 110 in which operates a cam roller 111, the cam roller 111 journaled on a stud 112 fixed to the bottom slide 113 of the cross slide 25. A suitable cross slide adjusting screw 114, Figure 4, journaled against axial movement on the cross slide 25 and operating in a nut 115 fixed to the bottom slide 113 serves to provide accurate final adjustment of the cross slide and cutting tools 28 for proper sizing of the work piece.

Thus, upon rotation of the cam drum 98, the cam plate 108 is moved so that the cross slide 25 can be moved toward or from the work. This cross slide movement may be effected before, during, or after movement of the carriage along the bed by the relative relationship of the block 104 in the slot 106 and the configuration of the cam drum slots in the cam drums 97 and 98. Thus, for example, the cam drum might be rotated at rapid traverse movement by energizing the rapid traverse motor 77 during which time the bar 102 would be taking up lost motion under the influence of the cam drum 97 while the cam drum would be initially moving the tools 28 radially into desired cutting position. At the time this position was reached, the surface 102a of the bar 102 would then come into engagement with the surface 104a of the block 104 fixed on the bed so as to begin the longitudinal movement upon further rotation of the shaft 94. At this time also it might be desirable to drop the rotation speed of the shaft 94 down to feeding speed by de-energizing the motor 77 and allowing the feed drive through the overrunning clutch 75 to now take over rotational control of the cam drums 97 and 98. After the carriage 21 has traveled the full length of its longitudinal movement as determined by the shape of the cam slot 99, the slot may then reverse its direction of helix whereupon the carriage would be left stranded in dwell position to cease its longitudinal movement since the bar 102 would then begin moving in the opposite direction with the surface 104b moving toward the surface 102b and during which time the cam drum 98 continues to rotate to withdraw the tools 28 radially outwardly to complete, for example, a facing cut on the work. After the surface 104b engages the surface 102b, the carriage would then again, under the influence of the cam drum 97, return backward longitudinally of the bed to initial starting position to begin another cutting cycle.

Thus, there is provided a mechanism whereby a continuous drive to the cam drum at rapid traverse or feed may effect a delayed application of the longitudinal feed movement while initially positioning the cutting tools in cross movement and then automatically picking up the longitudinal feed movement and again bringing it to a stop while allowing the cutting tools to feed radially outwardly, after which automatically beginning again the return longitudinal movement of the carriage, all of said movements being accomplished with a single continuous direction of rotation of cam drum mechanism.

The rear carriage 22 is operable similarly to that of the front carriage just described in detail and suffice it to indicate that the power to the rear carriage is derived from a chain sprocket gear 116 fixed on the shaft 87 and having a chain drive 117 extending to the rear of the lathe bed to engage the chain sprocket 118 fixed on the rear drive shaft 119. This shaft 119 has a splined portion 120 extending longitudinally of the rear portion of the bed as in the case of the drive shaft portion 88 of shaft 87. A splined bore gear 121 slidingly engaging in driving relationship on the splined portion 120 drives an idler gear 122 mounted on an idler shaft 122a which is journaled in the rear carriage 22 and carries a second gear 122b which engages with the cam drum drive gear 123 mounted on the cam drum shaft 123a carrying the rear cam drums 124 and 125. A similar lost motion connection to that of the front carriage is provided between the longitudinal feed bar 126 slidably mounted in guideways 127 along the rear of the bed and connected to be actuated from the cam drum 124 through the cam roller 128 and slot 129. A similar lost motion connection is provided by the block 130 and slot 130a to that of the block 104 and slot 106 shown in Figure 5.

A cam slot 131 in the cam drum 125 actuates the cam roller 132 connected to the cam plate 133 slidably mounted in suitable guideways 134 in the rear carriage 22. In this case, the cam plate is provided with rack teeth 135 which actuate the pinion 136 of a vertical stub shaft 137 which in turn has a pinion 138 engaging a rack 139 fixed to the cross slide 29 so that longitudinal reciprocation of cam plate 133 effects directly cross slide movement through the rack and pinion mechanism just described in the cross slide 29. A relative relationship of the longitudinal carriage movement of the carriage 22 and the cross slide movement of the cross slide 29 is similar to that described with respect to the front carriage 21 and its cross slide 25 except that in this instance of the rack and pinion drive to the cross slide a greater degree of cross slide travel may be effected as the rear slide and tools 32 are ordinarily used for long facing cuts on the work piece.

A work cycle control cam drum 140 is driven synchronously with the cam drums for actuating the tool carriages and slides through gearing 141, 142, 143, and 144 having the same ratio as the gearing 89, 91, 92, and 93, so that the control cam drum 140 rotates at the same speed as the cam drums in the carriages 21 and 22. On the cam drum is the rapid traverse control cam 145 adapted to actuate the limit switch LS—1 and a spindle stop control cam 146 on the drum 140 to actuate the limit switch LS—2 to control the operation of the spindle drive motor.

Figures 7, 8:
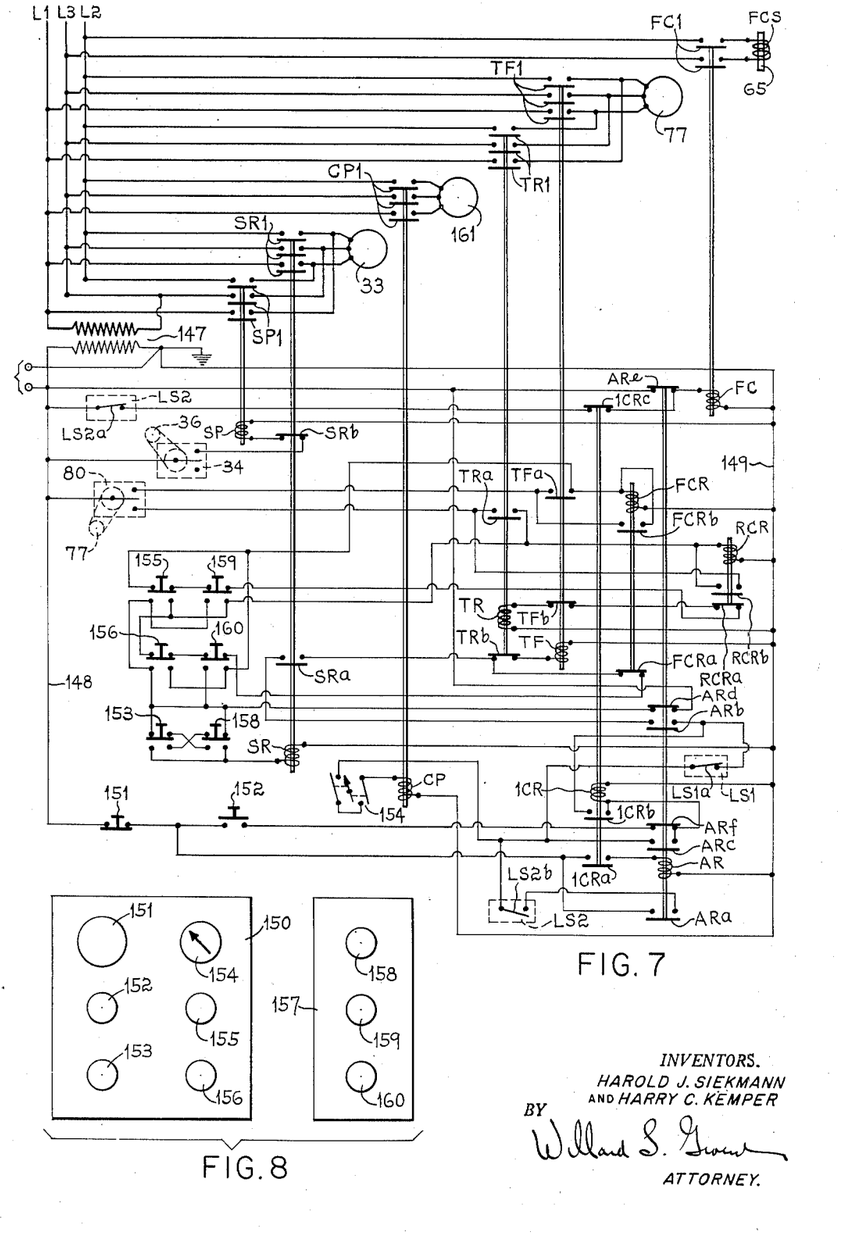
Figure 7 is a wiring diagram of the electric control mechanism for the automatic lathe.
Figure 8 is a view of the front and rear push button control stations for the machine.

Electric power for operating the lathe is derived from the usual three-phase alternating current supply connected to the leads L1, L2, and L3, as seen in Figure 7. The control power for operating the control mechanism is derived from leads L1 and L3 connected to the primary winding of the control transformer 147. The secondary winding of the transformer 147 is connected to the control current leads 148 and 149. A pair of front and rear control stations indicated in Figure 8 are provided on the machine, the front control station 150, Figure 8, having the spindle stop button 151, the spindle start button 152, and a spindle jog button 153. The front control station also has a coolant selector switch 154 for controlling the coolant supply to the work and cutting tools. There is also provided a forward rapid traverse jog button 155 and a reverse rapid traverse jog button 156. The rear control station 157 has a spindle jog button 158 and a rapid traverse forward jog button 159 and a rapid traverse reverse jog button 160.

To start the machine, the operator presses the start button 152 to energize relay 1CR which closes contact 1CRa and 1CRb providing a holding circuit to maintain 1CR energized. Closing of 1CRa energizes the contactor CP, closing power contacts CP1 to energize the coolant pump motor 161 which drives the usual coolant pump (not shown) for supplying coolant to the cutting tools and work. The coolant pump may be turned off and on at any time by manipulation of the selector switch 154. Closing of contact 1CRa energizes relay AR to close contacts ARa, ARb, and ARc and open contacts ARd and ARe. The spindle run contactor SR is thus energized to close the power contacts SR1 to apply line current from L1, L2, and L3 to the main spindle drive motor 33.

Contact ARf of the relay AR is provided so that after the relay AR has been energized the operator cannot maintain the relay 1CR energized by holding continuously down the start push button 152. If this were the case, it would interfere with the proper functioning of the limit switch LS1 which would otherwise be shorted out if the operator continuously held down the start button 152. Thus LS1 is not interfered with so that when it is actuated to stop rapid raverse it may function properly.

At the beginning of the cycle, the normally closed limit switch LS1 is closed. Whenever the switch LS1 is actuated by the dog 145, it is opened to cut out rapid traverse movement of the tool slides. Thus, at the beginning of the cycle, after the spindle motor 33 has been energized, the dog 145 is not contacting the limit switch LS1 so that the traverse forward contactor TF is energized, closing the forward rapid traverse motor contacts TF1 to cause rapid traverse motor 77 to rapidly move the tool slides and carriages up to working position.

Limit switch LS2 controls the spindle motor 33 and has control contact LS2b which is open when the machine is in starting position of the control cam drum 140. As soon as the machine is started and the rapid traverse movement of the tools begins, the dog 146 is relieved from actuating the limit switch LS2, allowing its contacts LS2b to close. It will also be noted that limit switch LS2 has a normally closed contact LS2a which opens as soon as the machine starts up in the operation cycle to de-energize the feed clutch relay FC to open contacts FC1 and de-energize the solenoid FCS to allow the feed clutch to engage to transmit feed drive power from the head stock and work spindle 14 through the over-running clutch 75 to actuate the carriages and cross slides, as described.

As rapid traverse movement of the tools continues, the cam 145 is rotated by the cam drum 140 to engage limit switch LS1, causing its normally closed contact LS1a to be opened as the tools approach actual cutting position. This de-energizes the traverse forward contactor TF, opening contacts TF1 and de-energizing the rapid traverse motor 77. The feed drive then picks up through the overrunning clutch to drive the carriages and cross slides in feeding movement.

After the actual cutting has been completed on the work piece, the limit switch LS1 is relieved from the trip dog 145 to again incite rapid traverse movement by again re-energizing contactor TF and closing contacts TF1 to again cause rapid rotation of the cam drums which are so designed that continuous rotation in the same direction now effects rapid return movement of the carriages and tool slides. As the tools approach return or stop position, the rapid traverse motor, spindle motor, and automatic relay AR are de-energized by opening of LS2b. The dog 146 on the cam drum 140 actuates limit switch LS2 so as to close contact LS2a to energize the feed clutch solenoid FCS to disengage the feed clutch 60. The contact LS2b of the limit switch LS2 is opened at this time to de-energize the relays AR and CP to shut off the spindle motor 33 and the coolant pump motor 161. The spindle motor 33 is rapidly brought to a stop by energizing the relay SP to close contacts SP1 momentarily to reverse line current to the spindle drive motor 33 which is released upon opening of the zero speed or plugging switch 34 as the motor comes to a stop in a well-known manner.

Thus, whenever the machine is in the stop position, the feed drive through the clutch 60 to the head stock transmission is disconnected automatically through the limit switch LS2 and its contact LS2a. By this arrangement, the rapid traverse motor 77 may be readily energized for either direction of rotation and rapid traverse of the tools. In other words, the rapid traversing movement of the cam drums may be reversibly applied, particularly for jogging the tool slides and carriages in rapid movement for setting up the tools. This is essential so that in the reversing operation of the rapid traverse motor, the motor will not be required to drive back through the overrunning clutch and the feed drive train to the work spindle and the head stock transmission, as this back drive could not be efficiently operated due to the great speed up from the rapid traverse drive motor to the head stock transmission mechanism. In other words, reverse energization of the rapid traverse motor 77, if the feed disconnection was not automatically made by the clutch 60, would cause the rapid traverse motor to try to rotate the feed transmission and head stock gearing at an extremely high rate of speed far beyond the capacity of power of the rapid traverse motor. Thus, no reverse rapid traverse could be effected properly without the feed disconnection by the clutch 60.

With this feed disconnect arrangement, the rapid traverse motor may be jogged in either direction. Forward rapid traverse movement is effected by manipulating the rapid traverse jog buttons 155 or 159 at the front and rear of the machine so as to energize the contactor TF to close contacts TF1, effecting forward rapid movement of the motor 77. At the same time, relay RCR is energized to open its normally closed contact RCRa and to close contact RCRb. However, as soon as the rapid traverse motor starts up, the plugging switch 80 moves so as to energize relay FCR which opens contact FCRa and again de-energizes the rapid traverse forward relay TF to disconnect power to the rapid traverse motor. As the motor slows down toward stop, the plugging switch 80 again opens de-energizing relay FCR and allows its contact FCRa to again close and to again re-energize the forward contactor TF to again energize the rapid traverse motor 77 in forward movement. Thus, by continuously holding down the jog buttons 155 or 159, an intermittent forward jogging motion is effected in the rapid traverse motor for the tools.

In a similar way, pressing of the buttons 156 and 160 will effect the reverse rapid traverse movement controlling the traverse reverse relay TR through the medium of the plugging switch 80 as in the case of the forward rapid traverse movement. There is provided a contact ARd opened when relay AR is energized so as to automatically cut out the operation of the rapid traverse jog buttons in either direction so that when the machine is normally operating in its automatic cycle no damage can result and no rapid traverse movement take place in either direction should the operator accidentally press one of the rapid traverse jog buttons. There is thus provided an intermittent rapid traverse movement under push button control in either direction for the tool carriages and slides. There is also associated with the control mechanism means whereby the feed is automatically connected to drive the tool slides and is automatically disconnected from the head stock transmission whenever the machine is in retracted or stopped position and reversible rapid traversing movements are to be effected in the tool slides and carriages. It will be noted that whenever the spindle motor 33 is energized to drive the work spindle by energizing relays 1CR and AR, the feed clutch relay FC will be de-energized so as to automatically engage the feed during spindle rotation.

During the normal operating cycle of the machine, the rapid traverse motor is plugged from running position to stop position by the plugging switch 80 which must be set to open at or slightly above the speed at which the motor is normally slowly rotated during application of feed power through the overrunning clutch 75 so that power will be cut off from the motor before it actually comes to a stop. This is essential, otherwise the reverse power will be applied to the motor which will tend to back up and buck the feed drive through the overrunning clutch. Therefore, the zero speed switch actually does not open at zero speed but at a speed the same as or slightly above the normal slow rotation it receives when de-energized from the feed drive.

On the reverse drive, however, the overrunning clutch does not pick up the drive motor in feed action because the reverse rapid traverse movement can only be effected when the machine is not set up in normal operating cycle but only with the feed solenoid FCS energized to disconnect the feed drive. In this set up, the zero speed switch 80 cuts out when the motor has come to a full stop.

There has thus been provided in automatic lathe feed mechanism a lost motion drive connection between the longitudinal and cross slide movements of the lathe for effecting sequential operation of feed and rapid traverse movements to the tools together with an electric control mechanism adapted to effect reversible rapid traverse movements to the slides and carriages of the lathe. There has also been provided, in connection with an electrically controlled feed and rapid traverse mechanism for the machine, an automatic arrangement for disconnecting the feed mechanism during reversible rapid traverse jogging movements to the tool slides and carriages.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a feed mechanism for an automatic lathe having a head stock transmission, a main drive motor for driving said transmission, a work spindle driven from said transmission, and a feed transmission driven from said work spindle including a feed disconnect clutch connected to be driven from said spindle, an overrunning clutch interconnected between said feed disconnect clutch and the tool feeding mechanism of said lathe, a rapid traverse drive motor operable at forward normal cutting cycle speed and reversible jogging speeds connected to said tool feeding mechanism, control means for simultaneously stopping said main drive motor and operating said feed clutch to connect feed drive to said feeding mechanism, manually operable control means for intermittently reversibly jogging said rapid traverse motor and further control means operable to disconnect said feed clutch when said rapid traverse motor is being jogged.

2. In an automatic lathe feed mechanism including, a head stock transmission, a main drive motor for rotating said transmission, a work spindle driven from said transmission, and a feed drive transmission for the tool feeding devices of said lathe, the combination of a feed disconnect clutch and an overrunning clutch serially interconnected between said spindle and tool feeding devices, a rapid traverse motor operable in forward movement for the normal feeding cycle and reversibly operable in jogging movements connected directly to actuate said devices, control means for reversibly jogging said rapid traverse motor, further control means operated by the relative position of movement of said feed drive transmission for rendering said rapid traverse motor operative or inoperative in normal forward feed cycle rapid traverse direction, and means for operating said feed disconnect clutch to disconnect feed driving power from said spindle to said tool feeding devices when said rapid traverse motor is being actuated in reversible jogging movements.

3. In a feed mechanism for an automatic lathe including a head stock transmission, tool feeding devices, and a power connection to apply feed movement to said devices from said head stock transmission, a unidirectionally operated rapid traverse motor connected to actuate said tool feeding devices in normal cutting cycle, means for reversibly operating said rapid traverse motor for jogging movement of the tool feeding devices, a plugging zero speed switch directly connected in said motor circuit, a feed disconnect clutch and an overrunning clutch serially interconnected between said head stock transmission and said devices, said zero speed switch being arranged to disconnect reverse breaking power from said motor at or above feeding speed of said tool feeding devices when operating in one direction and to stop rapid traverse motor reverse plugging current when said motor has been brought to zero speed of rotation in the opposite direction.

4. In an automatic lathe feed mechanism having a head stock transmission, a work spindle, a feed disconnect clutch driven from said spindle, an overrunning clutch driven from said feed disconnect clutch, and a tool feeding device driven from said overrunning clutch, a rapid traverse motor connected to said tool feeding device, control means operable by the motion of said tool feeding device for energizing or de-energizing said rapid traverse motor in forward cutting cycle movement, and further manually operated control means for reversibly operating said rapid traverse motor in jogging movements when said tool feeding devices are in retracted position.

5. In an automatic lathe feed mechanism having a head stock transmission, a work spindle, a feed disconnect clutch driven from said spindle, an overrunning clutch driven from said feed disconnect clutch, and a tool feeding device driven from said overrunning clutch, a rapid traverse motor connected to said tool feeding device, control means operable by the motion of said tool feeding device for energizing or de-energizing said rapid traverse motor in forward cutting cycle movement, and further manually operated control means for reversibly operating said rapid traverse motor in jogging movements when said tool feeding device is in retracted position, including control means for automatically disconnecting said feed disconnect clutch when said tool feeding device is in retracted stopped position.

6. In an automatic lathe feed mechanism having a head stock transmission, a work spindle, a feed disconnect clutch driven from said spindle, an overrunning clutch driven from said feed disconnect clutch, and a tool feeding device driven from said overrunning clutch, a rapid traverse motor connected to said tool feeding device, control means operable by the motion of said tool feeding device for energizing or de-energizing said rapid traverse motor in forward cutting cycle movement, and further manually operated control means for reversibly jogging said rapid traverse motor when said tool feeding devices are in retracted position, including control means for automatically disconnecting said feed disconnect clutch when said tool feeding devices are in retracted stopped position, and further control means for rendering a main drive motor for said head stock transmission inoperative when said tool feeding devices have returned to retracted position.

7. In an automatic lathe feed mechanism, a head stock drive motor, a head stock transmission driven from said motor, a work spindle driven from said transmission, a feed disconnect clutch driven from said spindle, an overrunning clutch driven from said feed disconnect clutch, a tool feeding device driven from said overrunning clutch, a unidirectionally operating rapid traverse motor directly connected to drive said tool feeding device in a cutting cycle, control means for controlling the operation of said head stock drive motor, said feed disconnect clutch, and said rapid traverse motor in said unidirectional operation in a predetermined sequential relationship, and manually operated control means for reversibly jogging said rapid traverse motor.

8. In an automatic lathe feed mechanism, a head stock drive motor, a head stock transmission driven from said motor, a work spindle driven from said transmission, a feed disconnect clutch driven from said spindle, an overrunning clutch driven from said feed disconnect clutch, a tool feeding device driven from said overrunning clutch, a reversible rapid traverse motor directly connected to drive said tool feeding device, control means for controlling the operation of said head stock drive motor, said feed disconnect clutch, and said reversible rapid traverse motor in a predetermined sequential relationship, including a cycle control cam drum operable in timed relationship with the movement of the tool feed device, a limit switch operable by the movement of said cam drum to predetermined positions in a work cycle to cause said rapid traverse motor to operate in cutting cycle forward movement or stop, a second limit switch operable by the movement of said cam drum to a return stop position for controlling the operation of said head stock drive motor and said feed disconnect clutch, and manually operated control means for intermittently jogging said rapid traverse motor in either direction.

9. In an automatic lathe feed mechanism, a main drive motor, a head stock driven from said main drive motor, a work spindle driven from said head stock transmission, a feed disconnect clutch driven from said spindle, an overrunning clutch driven from said feed disconnect clutch and a tool feeding device connected to be driven from said overrunning clutch, a rapid traverse motor directly connected to drive said tool feeding device, a control cam drum movable in timed relationship with the movement of said tool feeding device, control means on said drum for actuating a limit switch for applying or disconnecting forward driving power to said rapid traverse drive motor during the cutting cycle of said tool feeding devices, a second limit switch operable by means on said cam drum to render said main drive motor inoperative and to disconnect said feed clutch when said tool feeding device has been retracted to stop position, and manually operated control means for reversibly jogging said rapid traverse motor, and control means responsive to the position of said tool feeding devices and cam drum in stop position to render said manually operated jogging means effective to reversibly energize said rapid traverse motor.

10. In an automatic lathe feed mechanism, a bed, a carriage movable longitudinally on said bed, a cross slide on said carriage movable transversely of said bed, an actuating cam drum journaled in said carriage, a cam on said drum connected to positively actuate said cross slide, a second cam on said drum, means including a lost motion connection operably connecting said second cam to said bed to traverse said carriage, and a source of feed and rapid traverse power connected to drive said cam drum for any position of said carriage on said bed.

HAROLD J. SIEKMANN.
HARRY C. KEMPER.

REFERENCES CITED

The following references are of record in the file of this patent:

UNITED STATES PATENTS

| Number | Name | Date |
| --- | --- | --- |
| 1,322,352 | Schellenbach | Nov. 18, 1919 |
| 2,144,735 | Granberg | Jan. 24, 1939 |
| 2,450,096 | Siekmann | Sept. 28, 1948 |